C. E. FEAZEL.
AIR HEATER.
APPLICATION FILED DEC. 13, 1917.
1,328,272. Patented Jan. 20, 1920.
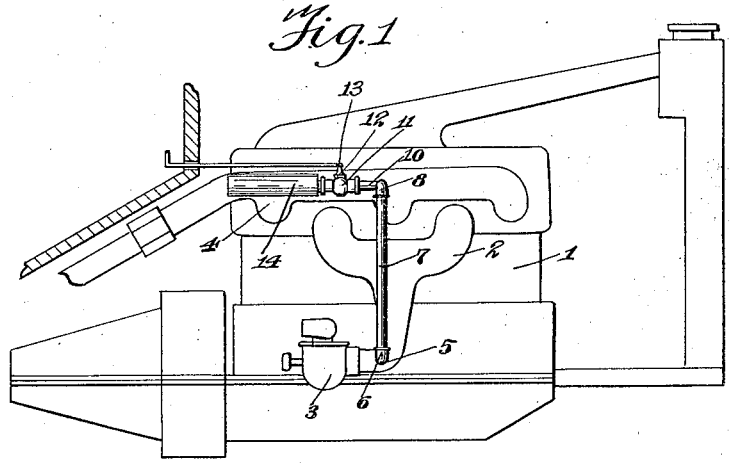
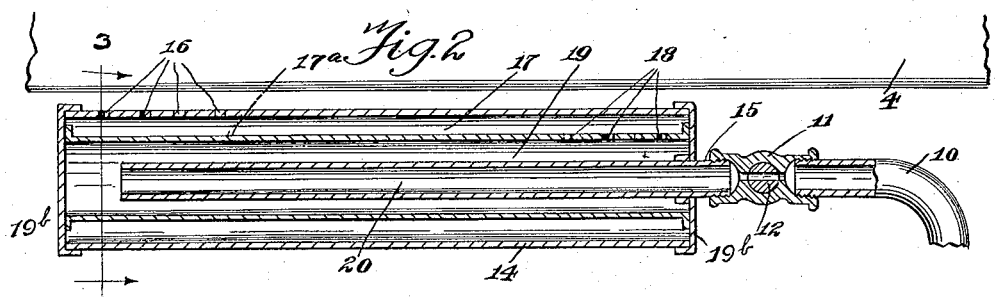
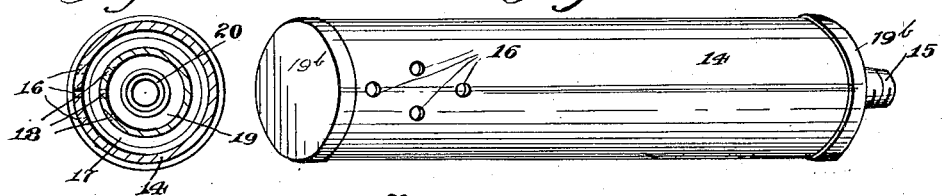
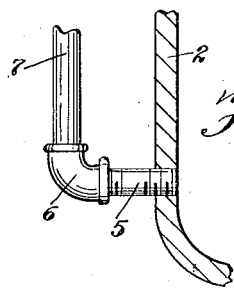
Witness
A. Lundell
Inventor
Clarence E. Feazel
By C. C. Shepherd
Attorney

UNITED STATES PATENT OFFICE.

CLARENCE E. FEAZEL, OF COLUMBUS, OHIO.

AIR-HEATER.

1,328,272.   Specification of Letters Patent.   Patented Jan. 20, 1920.

Application filed December 13, 1917. Serial No. 206,996.

*To all whom it may concern:*

Be it known that I, CLARENCE E. FEAZEL, a citizen of the United States, residing at Columbus, in the county of Franklin and State of Ohio, have invented certain new and useful Improvements in Air-Heaters, of which the following is a specification.

This invention relates broadly to internal combustion engines, and is particularly directed to an improved air heating attachment for use in connection with the fuel intake structures of such engines, said heater being constructed to permit of the introduction of heated air into the intake manifold of an engine at certain periods of the latter's operation, in order to effect a reduction in fuel consumption without interfering with the operating efficiency of the engine.

To this end, the invention comprises an auxiliary air inlet and heating attachment comprising a cylindrical body adapted for association with the fuel intake structure of an engine at a point beyond the carbureter, and so situated as to receive the heat radiated by the engine's exhaust manifold, whereby air drawn through the body will be in a heated condition prior to being admitted into said intake structure.

Another object is to insure a thorough warming or heating of the air passing through the attachment, this being accomplished by providing the latter with an elongated cylinder having air intake openings formed in one end thereof, a second cylinder being concentrically located within the former cylinder and having openings provided therein opposite to the openings of the first named cylinder, the ends of these cylinders being covered by cap closures which are common to both of the cylinders and serve to define an annular chamber therebetween. Coöperative with this second cylinder is an open ended pipe, the latter being concentrically positioned within the second cylinder and formed to pass through one of said cap closures so as to terminate at a substantial distance beyond the openings in said second cylinder, this structure being such that a second chamber is defined between the second cylinder and said pipe, the interior of the pipe in itself serving to define a third chamber. These intercommunicating and concentrically arranged chambers are so related as to produce a tortuous path of air circulation through the heater, and as the latter derives its heat by reason of its intimate location with respect to the exhaust structure of an engine, air discharged therefrom and into an intake manifold will be in ready condition to intermingle with the vaporized fuel stream passing through the latter, thus resulting in an increased volume of fuel and a corresponding reduction in fuel consumption.

For a further disclosure of the invention, reference is to be had to the following description and to the accompanying drawing, forming a part of this specification, and in which similar characters of reference denote corresponding parts throughout the several views thereof.

In the drawing:

Figure 1 is a side elevation of the air heater comprising the present invention, and illustrating its application to a motor vehicle engine, Fig. 2 is a horizontal sectional view taken through the heater, Fig. 3 is vertical transverse sectional view, Fig. 4 is a detail perspective view of the heater, and Fig. 5 is a view representing the manner in which the heater is attached to an engine.

Referring more particularly to the drawing the invention is shown as applied to a standard form of internal combustion engine 1, the latter in this instance being of the type employed upon a motor vehicle and includes a fuel inlet manifold 2, carbureter 3 and an exhaust manifold 4. Threaded into the manifold 2 at a point just beyond the carbureter is a short horizontally extending, threaded pipe section 5, to which is secured an elbow 6, the latter also being connected with a vertically extending pipe section 7; this pipe section terminates at its upper end in a right angularly extending elbow 8, to which is threadedly connected the offset extremity 10 of a valve structure 11. The latter may be of any well known type and in this instance is provided with a rotatable valve member 12 which is operated by means of a handle 13 so as to control the passage of fluid through the valve structure. This handle 13 may be connected, if desired, with a controlling wire leading from the vehicle driver's position so that the flow of fluid through the valve structure may be conveniently controlled without necessitating the removal or lifting of the engine hood.

The invention primarily consists of an air heating body, which is formed to permit of a circulation of air therethrough and to effect the heating of such air during its transit through the heater, whereby air in a heated state may be drawn through the piping described and introduced into the intake manifold 2, where it will be commingled with the fuel stream passing through the latter. To this end, the heater consists preferably of an enlongated outer cylinder 14, in the wall of which is provided a multiplicity of openings 16. These openings are preferably located in intimate relation with the exhaust manifold 4, to secure an initial heating of the air prior to its introduction into the interior of the outer cylinder 14. Positioned concentrically within said cylinder is a second cylinder 17$^a$ which is of smaller diameter than the outer cylinder so as to define an annular air chamber 17 therebetween. In this second cylinder there is formed a plurality of openings 18, which are located at the opposite end of the chamber 17 as regards the openings 16, which openings 18 establish communication between the annular chamber 17 and the annular chamber 19 formed in the second cylinder 17$^a$. The ends of the cylinders 14 and 17$^a$ are closed by means of cap closures 19$^b$, which serve to govern the path of air circulation within the heater and to also maintain concentricity between the inner and outer cylinders.

Carried by one of the closures 19$^b$ is a longitudinally extending open ended pipe 20, which is positioned diametrically of the inner cylinder 17$^a$ and is formed to terminate at a point substantially beyond the openings 18 formed in said second cylinder 17$^a$, thus providing the annular chamber 19 between said latter cylinder and the pipe 20. The bore of this pipe 20 forms in effect a third chamber which is in communication with the chamber 19 by reason of the open end construction of said pipe. The other end of this pipe connects with the valve structure 11, as is clearly shown in Fig. 2 of the drawings.

It will thus be observed that air drawn into the heater, by reason of engine suction, will be caused to circulate in a devious manner. This, as will be apparent, is primarily due to the manner of establishing communication between the various air chambers of the heater, and it will be observed that air drawn into the chamber 17 will be caused to circulate substantially the full length of the latter before being admitted into the second chamber 19 by way of the openings 18, which latter are positioned at the opposite end of the chamber 17 with regard to the intake openings 16. Then, to pass out of the chamber 19, the air will be obliged to travel approximately the full length of the latter so as to gain admittance into the bore of the pipe 20, whence it is drawn by way of the pipe structure 7 into the intake manifold of the engine 1. This tortuous path of air circulation insures complete heating of the air before the same is admitted into the intake structure, and this desirable result is obtained in the relatively small area occupied by the heater which, owing to its condensed formation is situated at all points throughout its length in intimate relation with the exhaust manifold 4, so that air passing through the chambers 17, 19 and 20 will receive full benefit of this radiated heat.

From the foregoing it will be apparent that there is provided a device of considerable utility and practical merit, which is capable of being readily applied to engines of standard construction and which will operate to reduce the fuel consumption thereof. It has been found desirable, when initially starting the engine 1 to close the valve 11, but after the engine is operating normally, this valve is then opened and the air heater is permitted to function. By preheating the air before its introduction into the manifold 2 its intermingling with the fuel stream of the latter may be readily and efficiently accomplished, so that the volume of the fuel will be enlarged, per vaporization obtained and a mixture of proper combustible proportions obtained.

Having described the invention, what is claimed as new and patentable is:

An air heating attachment for internal combustion engines comprising an elongated cylinder having air intake openings at one end thereof, a second cylinder located concentrically within the former and having air intake openings at the opposite end thereof, a cap closure common to both cylinders for each end of the assemblage, said cylinders being of a size to form an annular chamber between them, an open ended pipe extending into said second named cylinder through one of said cap closures a substantial distance beyond the openings in the latter, said pipe being also of a size to form a second annular chamber in communication with said first named chamber to form a tortuous passageway, and a valve structure in said pipe for governing the amount of air passing therethrough.

In testimony whereof I affix my signature.

CLARENCE E. FEAZEL.